United States Patent [19]

Saotome et al.

[11] Patent Number: 4,851,675

[45] Date of Patent: Jul. 25, 1989

[54] RADIATION IMAGE READ-OUT METHOD AND APPARATUS

[75] Inventors: Shigeru Saotome; Masamitsu Ishida; Kazuo Shimura; Hideo Watanabe, all of Kaisei, Japan

[73] Assignee: Fuji Photo Film Co., Ltd., Kanagawa, Japan

[21] Appl. No.: 920,179

[22] Filed: Oct. 17, 1986

[30] Foreign Application Priority Data

Oct. 18, 1985 [JP] Japan .................................. 60-232516

[51] Int. Cl.$^4$ ........................ G01T 1/105; G03B 42/08
[52] U.S. Cl. ................................ 250/327.2; 250/484.1
[58] Field of Search .................... 250/327.2, 484.1; 364/414, 413.13

[56] References Cited

U.S. PATENT DOCUMENTS 4,302,672  11/1981  Kato et al. ........................ 250/327.2
4,638,162   1/1987  Tanaka et al. ..................... 250/327.2

Primary Examiner—Janice A. Howell
Assistant Examiner—Richard Hanig
Attorney, Agent, or Firm—Gerald J. Ferguson, Jr.

[57] ABSTRACT

In a radiation image read-out method and apparatus, a stimulable phosphor sheet carrying a radiation image stored thereon is exposed to stimulating rays which cause the stimulable phosphor sheet to emit light in proportion to the stored radiation energy, and the emitted light is photoelectrically detected by a photodetector to obtain image signals. The detection range of the photodetector for the emitted light is adjusted to a range substantially wider than an expected light emission range. The image signals obtained with the detection range by the photodetector is stored in a storage device, and sent to a histogram analysis device for creating a histogram of the image signals and analyzing image input information on the stimulable phosphor sheet based on the histogram. An image signal in a range useful for reproduction of a visible image is extracted from the image signals stored in the storage device on the basis of the image input information obtained by the histogram analysis device, and utilized for reproducing the visible image.

6 Claims, 2 Drawing Sheets

RADIATION IMAGE READ-OUT METHOD AND APPARATUS

BACKGROUND OF THE INVENTION

1. Field of the Invention

This invention relates to a radiation image read-out method for exposing a stimulable phosphor sheet carrying a radiation image stored thereon to stimulating rays which cause the stimulable phosphor sheet to emit light in proportion to the stored radiation energy, photoelectrically detecting the emitted light, and thereby reading out the radiation image. This invention also relates to an apparatus for carrying out the method.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object to have a radiation image stored thereon, and is then scanned with stimulating rays such as a laser beam which cause the stimulable phosphor sheet to emit light in proportion to the stored radiation energy. The light emitted by the stimulable phosphor sheet when it is exposed to stimulating rays is photoelectrically detected and converted into an electric image signal, which is processed as desired to reproduce a visible image on a recording medium such as a photographic film or on a display device such as a cathode ray tube (CRT).

The radiation image recording and reproducing system using a stimulable phosphor sheet is advantageous over conventional radiography in that the image can be recorded over a very wide range (latitude) of radiation exposure and further in that the electric signal used for reproducing the visible image can be freely processed to improve the image quality for viewing, particularly for diagnostic purposes. More specifically, since the amount of light emitted upon stimulation after the radiation energy is stored on the stimulable phosphor sheet varies over a wide range in proportion to the amount of said stored energy, it is possible to obtain an image having desirable density regardless of the amount of exposure of the stimulable phosphor sheet to the radiation, by reading out the emitted light with an appropriate read-out gain and converting it into an electric signal to reproduce a visible image on a recording medium or a display device. The electric signal may further be processed as desired to obtain a radiation image suitable for viewing, particularly for diagnostic purposes. This is very advantageous in practical use.

As mentioned above, in the radiation image recording and reproducing system using a stimulable phosphor sheet, compensation for deviation of the level of the radiation energy stored on the stimulable phosphor sheet from a desired level can easily be carried out by adjusting the read-out gain to an appropriate value when photoelectrically reading out the light emitted by the stimulable phosphor sheet upon stimulation thereof. Therefore, the quality of the reproduced radiation image is not adversely affected by a fluctuation in radiation dose due to fluctuating tube voltage or MAS value of the radiation source, variation in the sensitivity of the stimulable phosphor sheet or the photodetector, changes in radiation dose resulting from differences in the condition of the object, or differences in radiation transmittance of the object, and the like. Also, it is possible to obtain a desirable radiation image even when the radiation dose to the object is low. Further, it is possible to obtain a radiation image having a high image quality of high contrast, high sharpness and low noise, and the like, by converting the light emitted by the stimulable phosphor sheet into an electric signal, and processing the electric signal as desired However, in order to eliminate various influences caused by variations in radiographic exposure conditions and/or to obtain a radiation image having a high image quality or a high diagnostic efficiency and accuracy, it is necessary to investigate such image input conditions of the radiation image stored on the stimulable phosphor sheet as, for example, the level of radiation dose used for image recording, or the image input pattern which is determined by the portion of the object (e.g. the chest or the abdomen of the human body) or the image recording method used, such as plain image recording or contrasted image recording, before reproducing the radiation image to a visible image, and then to adjust the read-out gain to an appropriate value or to process the electric signal appropriately based on the detected image input conditions or the image input pattern. The image input conditions and the image input pattern will hereinafter be simply referred to as the image input information when they are referred to generically. It is also necessary to determine the scale factor to optimize the resolution in accordance with the contrast of the image input pattern.

Investigation of the image input information may be conducted prior to the visible image reproduction by use of the method as disclosed in Japanese Unexamined Patent Publication No. 58(1983)-67240. In the disclosed method, a read-out operation for detecting the image input information of a radiation image stored on a stimulable phosphor sheet (hereinafter referred to as the preliminary read-out) is conducted in advance by use of stimulating rays having stimulation energy of a level lower than the level of the stimulation energy of stimulating rays used in a read-out operation for obtaining a visible image for viewing, particularly for diagnostic purposes (hereinafter referred to as the final read-out), and thereafter the final read-out is carried out. In the final read-out, the read-out gain and/or the scale factor is adjusted to an appropriate value, and/or an appropriate image processing is conducted, on the basis of the image input information obtained by the preliminary read-out.

As described above, the level of the stimulating rays used in the preliminary read-out is lower than the level of the stimulating rays used in the final read-out. That is, the effective energy of the stimulating rays which the stimulable phosphor sheet receives per unit area in the preliminary read-out should be lower than the effective energy of the stimulating rays used in the final read-out. In order to make the level of the stimulating rays used in the preliminary read-out lower than the level of the stimulating rays in the final read-out, the output of the stimulating ray source such as a laser beam source may be decreased in the preliminary read-out, or the stimulating rays emitted by the stimulating ray source may be attenuated by an ND filter, an AOM, or the like, positioned in the optical path. Alternatively, a stimulating ray source for the preliminary read-out may be positioned independently of the stimulating ray source for the final read-out, and the output of the former may be made lower than the output of the latter. Or, the beam diameter of the stimulating rays may be increased, the scanning speed of the stimulating rays may be increased, or the moving speed of the stimulable phosphor sheet may be increased in the preliminary read-out.

In the aforesaid method, since the image input conditions and the image input pattern of a radiation image stored on the stimulable phosphor sheet can be investigated in advance, it is possible to obtain a radiation image having an improved image quality, particularly a high diagnostic efficiency and accuracy, by adjusting the read-out gain and the scale factor in the manner most suitable for the image input pattern on the basis of the detected image input information without using a read-out system having a wide dynamic range.

However, in the case where the preliminary read-out and the final read-out are conducted, since it is necessary to provide a means for varying the beam diameter of stimulating rays, a means for varying the scanning speed of stimulating rays, a means for varying the moving speed of the stimulable phosphor sheet, or the like, the read-out apparatus becomes complicated and expensive. Also, since the image read-out is conducted twice (one preliminary read-out and one final read-out), the read-out processing speed becomes low.

An attempt has also been made to eliminate the preliminary read-out by controlling the radiation dose to the stimulable phosphor sheet by using a radiation photo-timer. However, this method has the drawback that it cannot cope with image recording of various object portions.

SUMMARY OF THE INVENTION

The primary object of the present invention is to provide a radiation image read-out method which is simple in configuration and inexpensive.

Another object of the present invention is to provide a radiation image read-out method which improves the read-out processing speed.

A further object of the present invention is to provide a radiation image read-out method which is adapted to image read-out for every object portion.

A still further object of the present invention is to provide a radiation image read-out method which provides a visible radiation image having an improved image quality, particularly a high diagnostic efficiency and accuracy.

The specific object of the present invention is to provide a radiation image read-out apparatus for carrying out the method.

The present invention provides a radiation image read-out method in which a stimulable phosphor sheet exposed to a radiation carrying an image to have the radiation image stored thereon is exposed to stimulating rays, and light emitted by the stimulable phosphor sheet in proportion to the stored radiation energy when the stimulable phosphor sheet is exposed to the stimulating rays is photoelectrically detected by a light detection means to obtain image signals for use in reproduction of a visible image, wherein the improvement comprises the steps of:

(i) adjusting a detection range of said light detection means for said light emitted by said stimulable phosphor sheet to a range substantially wider than an expected light emission range, (ii) storing said image signals obtained with said detection range in a storage means, and sending said image signals to a histogram analysis means for creating a histogram of said image signals and analyzing image input information on said stimulable phosphor sheet based on said histogram, (iii) extracting an image signal in a range useful for said reproduction of the visible image from said image signals stored in said storage means on the basis of said image input information obtained by said histogram analysis means, and (iv) utilizing said extracted image signal for said reproduction of the visible image.

The present invention also provides a radiation image read-out apparatus including a means for emitting stimulating rays to a stimulable phosphor sheet carrying a radiation image stored thereon, a means for moving said stimulable phosphor sheet, and a light detection means for photoelectrically detecting light emitted by said stimulable phosphor sheet in proportion to the stored radiation energy upon exposure to the stimulating rays and obtaining image signals for use in reproduction of a visible image, wherein the improvement comprises the provision of:

(i) a storage means for storing said image signals obtained with a detection range of said light detection means for said light emitted by said stimulable phosphor sheet, which is adjusted to a range substantially wider than an expected light emission range, (ii) a histogram analysis means for creating a histogram of said image signals and analyzing image input information on said stimulable phosphor sheet based on said histogram, and (iii) a signal extraction circuit for extracting an image signal in a range useful for said reproduction of the visible image from said image signals stored in said storage means on the basis of said image input information obtained by said histogram analysis means.

With the radiation image read-out method and apparatus in accordance with the present invention, it is possible to reproduce a visible radiation image always having an improved image quality, particularly a high diagnostic efficiency and accuracy, in accordance with changes in image input information on the stimulable phosphor sheet. Also, since the preliminary read-out is not necessary, it is possible to improve the read-out processing speed as compared with the case where the preliminary read-out is conducted. Further, it becomes possible to prevent the read-out apparatus from becoming complicated and expensive. Since the light emitted by the stimulable phosphor sheet is completely detected with a wide light detection range, it is also possible to cope with image read-out for every image recording of the object.

DESCRIPTION OF THE PREFERRED EMBODIMENTS

The present invention will hereinbelow be described in further detail with reference to the accompanying drawings.

Figure 1:
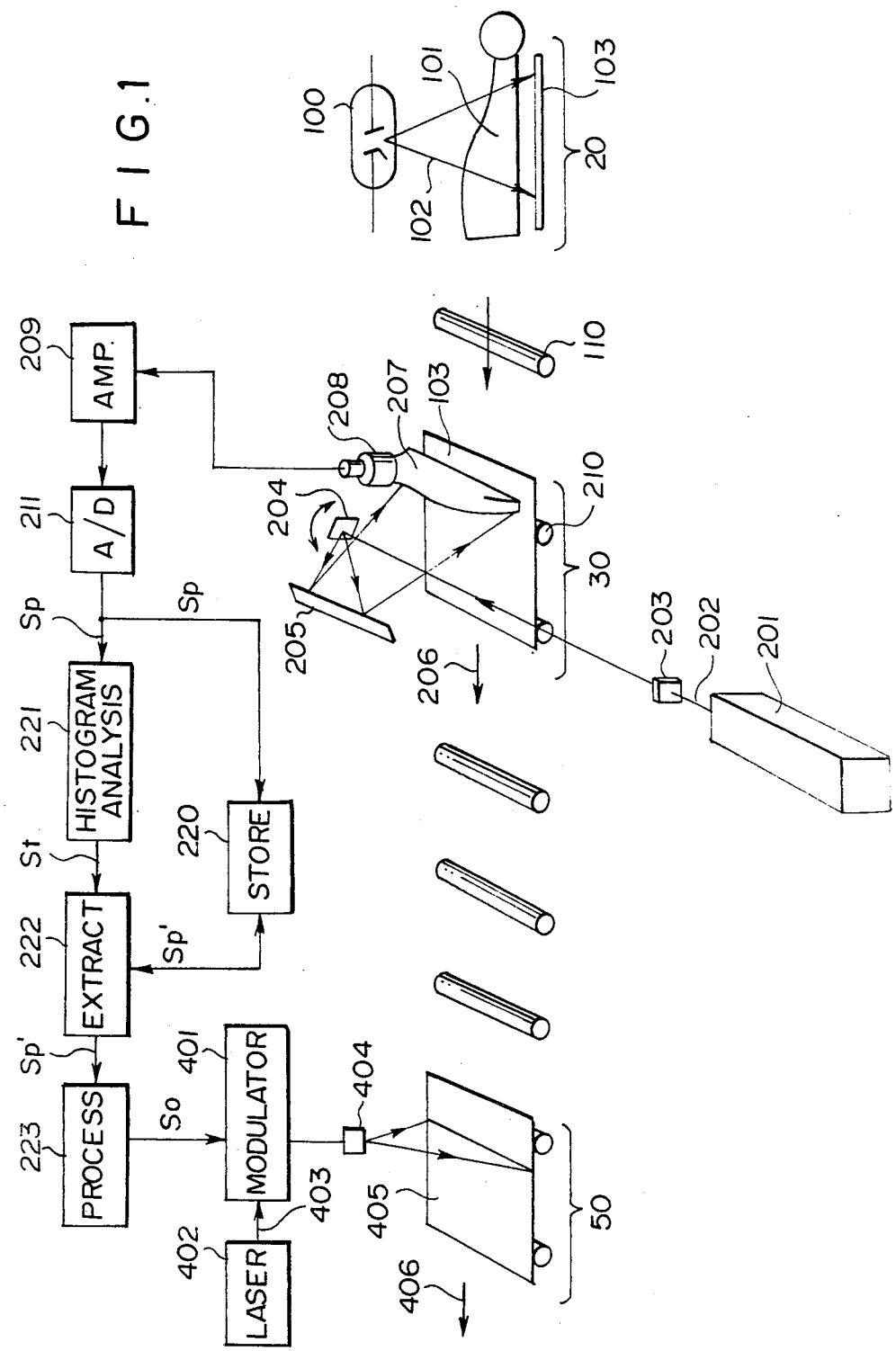
FIG. 1 is a schematic view showing the configuration of the radiation image recording and reproducing system wherein radiation image read-out is conducted by an embodiment of the radiation image read-out method in accordance with the present invention.

Referring to FIG. 1, the radiation image recording and reproducing system basically comprises a radiation image recording section 20, an image read-out section 30, and an image reproducing section 50. At the radiation image recording section 20, a radiation 102 is emitted by a radiation source 100 constituted by an X-ray tube or the like toward an object 101. A stimulable phosphor sheet 103 for storing radiation energy thereon is placed at the position exposed to the radiation 102 passing through the object 101, and a radiation image of the object 101 is stored on the stimulable phosphor sheet 103.

The stimulable phosphor sheet 103 carrying the radiation image of the object 101 stored thereon is sent to the image read-out section 30 by a sheet conveyance means 110 constituted by a conveyor roller or the like. At the image read-out section 30, a laser beam 202 emanated by a laser beam source 201 is first passed through a filter 203 for cutting off light having a wavelength within a range identical with the range of the wavelength of the light emitted by the stimulable phosphor sheet 103 upon stimulation thereof by the laser beam 202. Then, the laser beam 202 is one-dimensionally deflected by a light deflector 204 such as a galvanometer mirror and directed onto the stimulable phosphor sheet 103 by a plane reflection mirror 205. The laser beam source 201 is selected so that the laser beam 202 emitted thereby has a wavelength distribution different from and far apart from the wavelength distribution of the light emitted by the stimulable phosphor sheet 103 upon stimulation thereof. While the laser beam 202 impinges upon the stimulable phosphor sheet 103, the stimulable phosphor sheet 103 is moved in the direction as indicated by the arrow 206 (i.e. the sub-scanning direction) by a sheet conveying means 210 constituted by conveyor rollers or the like and, thus, the whole surface of the stimulable phosphor sheet 103 is exposed to and scanned by the laser beam 202.

When exposed to the laser beam 202 as mentioned above, the stimulable phosphor sheet 103 emits light in proportion to the radiation energy stored thereon, and the emitted light enters a light guide member 207 which may be of a shape and a material as disclosed in U.S. Pat. No. 4,346,295. The light is guided inside of the light guide member 207 through total reflection, emanated from a light output face of the light guide member 207 and received by a photodetector 208 constituted by a photomultiplier or the like. The light receiving face of the photodetector 208 is closely contacted with a filter for transmitting only light having the wavelength distribution of the light emitted by the stimulable phosphor sheet 103 and cutting off the light having the wavelength distribution of the stimulating rays, so that the photodetector 208 can detect only the light emitted by the stimulable phosphor sheet 103 upon stimulation thereof. The light detected by the photodetector 208 is converted into electric signals carrying the image input information, and amplified by an amplifier 209. The signals generated by the amplifier 209 are digitized by an A/D converter 211, and stored as image signals Sp to an image file 220 acting as a storage means and constituted by a frame memory, a magnetic disk or the like, and sent to a histogram analysis means 221. The read-out sensitivity of the photodetector 208 (e.g. the high voltage fed to a photomultiplier), the read-out gain of the amplifier 209, and the scale factor of the A/D converter 211 are fixed.

An image signal Sp' is extracted by a signal extraction circuit 222 as described later from the image signals Sp stored in the image file 220. The extracted image signal Sp' is converted by image processing circuit 223 into an image signal So, which is then entered to a light modulator 401 at the image reproducing section 50. At the image reproducing section 50, a laser beam 403 emitted by a reproducing laser beam source 402 is modulated by the light modulator 401 on the basis of the image signal So received from the image processing circuit 223, and is made to impinge upon a photosensitive material 405 such as a photographic film by a scanning mirror 404 for scanning the photosensitive material 405 by the laser beam 403. At this time, the photosensitive material 405 is moved normal to the aforesaid scanning direction, i.e. in the direction as indicated by the arrow 406 in synchronization with the scanning. Accordingly, the radiation image represented by the image signal So is recorded as a visible image on the photosensitive material 405. For reproducing the radiation image, it is possible to use any other appropriate method such as the aforesaid displaying on a CRT.

Extraction of the image signal Sp' conducted by the signal extraction circuit 222 will hereinbelow be described in detail. Upon receiving the image signals Sp from the A/D converter 211, the histogram analysis means 221 creates a histogram of the image signals Sp. The histogram becomes as indicated by, for example, the solid line in FIG. 2. However, the histogram may become as indicated by the broken line in FIG. 2, depending on the image input conditions of the radiation image on the stimulable phosphor sheet 103 (for example, the radiation dose from the radiation source), the image recording portion of the object 101, or the like. Therefore, in this embodiment, the light detection range of the photodetector 208 is adjusted to a range substantially wider than an expected light emission range so that the photodetector 208 completely detects the light emitted by the stimulable phosphor sheet 103 in the pattern as shown by the histogram indicated by the solid line in FIG. 2 and the light emitted thereby in the pattern as shown in the histogram indicated by the broken line in FIG. 2. For example, the aforesaid photomultiplier or the like can be adjusted to a light detection range of approximately 4 orders of ten in terms of relative sensitivity. In general, when the detection range of this level is ensured, it is possible to detect the aforesaid light completely.

Figure 2:
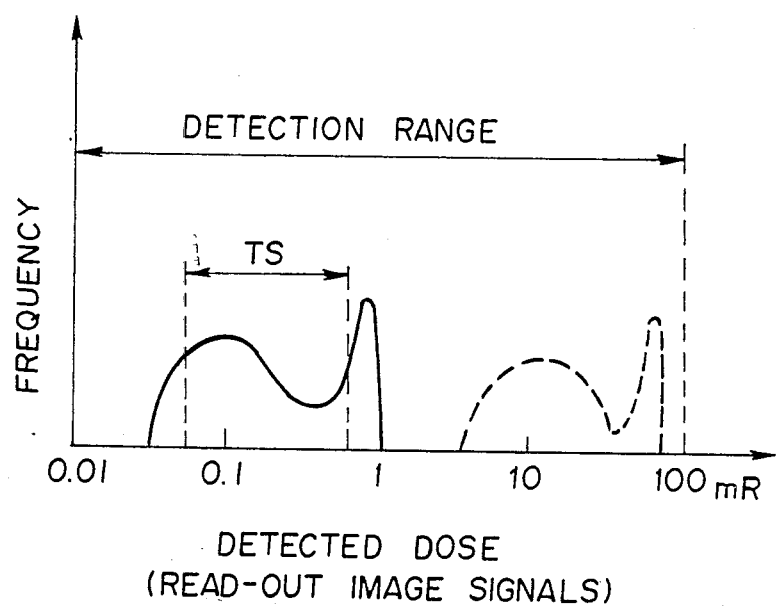
FIG. 2 is an explanatory view showing the radiation image read-out method in accordance with the present invention.

Then, the histogram analysis means 221 analyzes the image input information on the stimulable phosphor sheet 103 based on the histogram of the image signals Sp, and calculates an image signal range TS as shown in FIG. 2 useful for the reproduction of a visible image at the image reproducing section 50 on the basis of the analysis results. The program for determining the image signal range TS based on the analysis results may be determined experimentally.

The histogram analysis means 221 sends a signal St representing the image signal range TS to the signal extraction circuit 222. Upon receiving the signal St, the signal extraction circuit 222 extracts only the image signal Sp' within the range TS which the signal St represents from the image signals Sp stored in the image file 220. Since the radiation image is reproduced by use of only the image signal Sp' useful for the reproduction of a visible image at the image recording section 50, it is possible to obtain the reproduced visible image having correct contrast and suitable for viewing, particularly for diagnostic purposes.

In the image processing circuit 223, image processing such as gradation processing or frequency response processing is conducted. In this embodiment, gradation processing is conducted so that the gradation center value of the reproduced visible image corresponds to the image signal at the center of the image signal range TS. Therefore, the density range of the reproduced visible image always becomes approximately constant regardless of changes in the range of the image signals Sp (i.e. the level of the light emission amount) among the stimulable phosphor sheets, and therefore the reproduced visible image becomes suitable for viewing.

As mentioned above, with the method in accordance with the present invention, the reproduced visible image is formed based on the output of a partial narrow range in the output range of the photodetector 208. Therefore, in order to prevent the density resolution in the reproduced visible image from becoming low, the density resolution in digitizing by the A/D converter 211 should preferably be adjusted to be higher (e.g. by approximately 2 bits) than the density resolution required for the reproduced visible image.

Also, the amount of radiation stored on the stimulable phosphor sheet 103, i.e. the level of light emission amount, may be expected to some extent based on the radiation dose for image recording, the image recording portion of the object, or the like. Therefore, in the case where a photodetector the light detection range of which is not so much wide (of course, the light detection range must be substantially wider than the expected light emission range) is used as the photodetector 208, the light detection range of the photodetector 208 may be manually shifted in accordance with the radiation dose, the image recording portion of the object, or the like.

We claim:

1. A radiation image read-out method in which a stimulable phosphor sheet exposed to a radiation carrying an image to have the radiation image stored thereon is exposed to stimulating rays, and light emitted by the stimulable phosphor sheet in proportion to the stored radiation energy when the stimulable phosphor sheet is exposed to the stimulating rays is photoelectrically detected by a light detection means to obtain image signals for use in reproduction of a visible image, wherein the improvement comprises the steps of:
 (i) adjusting a detection range of said light detection means for said light emitted by said stimulable phosphor sheet to a range substantially wider than an expected light emission range, wherein said light detection means completely detects the light emitted by the stimulable phosphor sheet,
 (ii) storing said image signals obtained with said detection range in a storage means, and sending said image signals to a histogram analysis means for creating a histogram of said image signals and analyzing image input information on said stimulable phosphor sheet based on said histogram,
 (iii) extracting an image signal in a range useful for said reproduction of the visible image from said image signals stored in said storage means on the basis of said image input information obtained by said histogram analysis means, and
 (iv) utilizing said extracted image signal for said reproduction of the visible image.

2. A method as defined in claim 1 wherein gradation processing is conducted on said extracted image signal so that a gradation center value of the reproduced visible image corresponds to the image signal at the center of said range useful for said reproduction of the visible image.

3. A method as defined in claim 1 wherein density resolution in digitization of the image signals detected by said light detection means is adjusted to be higher than the density resolution required for the reproduced visible image.

4. A radiation image read-out apparatus including a means for emitting stimulating rays to a stimulable phosphor sheet carrying a radiation image stored thereon, a means for moving said stimulable phosphor sheet, and a light detection means for photoelectrically detecting light emitted by said stimulable phosphor sheet in proportion to the stored radiation energy upon exposure to the stimulating rays and obtaining image signals for use in reproduction of a visible image, wherein the improvement comprises the provision of:
 (i) a storage means for storing said image signals obtained with a detection range of said light detection means for said light emitted by said stimulable phosphor sheet, which is adjusted to a range substantially wider than an expected light emission range, wherein said light detection means completely detects the light emitted by the stimulable phosphor sheet,
 (ii) a histogram analysis means for creating a histogram of said image signals and analyzing image input information on said stimulable phosphor sheet based on said histogram, and
 (iii) a signal extraction circuit for extracting an image signal in a range useful for said reproduction of the visible image from said image signals stored in said storage means on the basis of said image input information obtained by said histogram analysis means.

5. An apparatus as defined in claim 4 further comprising an image processing circuit for conducting gradation processing on said extracted image signal so that a gradation center value of the reproduced visible image corresponds to the image signal at the center of said range useful for said reproduction of the visible image.

6. An apparatus as defined in claim 4 further comprising an A/D converter for converting said image signals detected by said light detection means into digital image signals, wherein density resolution in digitization of the image signals detected by said light detection means is adjusted to be higher than the density resolution required for the reproduced visible image.

* * * * *